United States Patent Office 2,799,658
Patented July 16, 1957

2,799,658

COLLOIDAL SILICA COMPOSITIONS

Ralph F. Nickerson, Marblehead, Mass., assignor to Monsanto Chemical Company, St. Louis, Mo., a corporation of Delaware No Drawing. Application May 2, 1952,
Serial No. 285,789

5 Claims. (Cl. 252—313)

The present invention relates to novel compositions containing colloidal silica. This invention also relates to methods of precipitating colloidal silica from silica aquasols which are stable under alkaline conditions, and it also relates to the redispersion of the precipitated colloidal silica.

Alkaline silica aquasols have been prepared in the prior art. Such aquasols have not been satisfactory heretofore for coating purposes, for example, in the coating of glass, metals or other base materials since the dry coatings do not adhere satisfactorily to the base material and they also crack or break up into fragments. Thus, it has not been possible heretofore to prepare adherent, continuous coatings on base materials by the use of alkaline silica aquasols. In accordance with this invention, on the other hand, it is possible to produce novel compositions containing colloidal silica which form adherent, continuous coatings on base materials such as glass or metals or the like.

The precipitation of silica from an alkaline silica aquasol by acidification or by treatment with various bivalent inorganic metal salts has been described in the prior art. Various types of precipitates are obtained in this manner depending in most part on the method used in preparing the silica aquasol and the precipitating agent employed. Some precipitates are gels which resemble the gels obtained by acidifying sodium silicate with a mineral acid such as sulfuric acid. Other precipitates are gelatinous or slimy in nature and cannot be filtered or centrifuged. All of the precipitates, when dried, are non-dispersible in water solutions of alkali and do not form colloidal solutions or dispersions therein. Moreover, it has not been possible, according to prior art methods, to produce a substantially anhydrous colloidal silica material which may be redispersed in colloidal form in water or alkaline aqueous solutions. Accordingly, it has been necessary heretofore to sell silica aquasols in commerce in the form of aqueous solutions or dispersions containing from about 15 to 30% by weight of colloidal silica and from about 85 to 70% by weight of water. The shipment of such aquasols thus involves the transportation of considerable amounts of water which is undesirable from the standpoint of handling of the product, high freight charges, the bulkiness of the material being shipped and the special precautions which must be taken to prevent freezing in cold weather.

In accordance with the present invention, on the other hand, it is possible to precipitate colloidal silica from silica aquasols without appreciable agglomeration of the colloidal silica particles, and it is also possible to separate the precipitated colloidal silica from the aqueous phase easily and efficiently and to dry the precipitated material to form a product which is capable of being dispersed in dilute alkaline aqueous solutions in the form of a comparatively stable sol or dispersion. Consequently, it is possible in accordance with the present invention to produce dry colloidal silica which may be shipped in the dry state and which is readily dispersed in water solutions of alkali at the point of use, thus avoiding the necessity of shipping, storing and handling large quantities of water. Moreover, it is also possible to prepare sols or dispersions of colloidal silica from the dry colloidal silica which are capable of providing adherent, continuous coatings on base materials such as glass or metals.

It is one object of this invention to provide novel, aqueous compositions containing colloidal silica which are capable of being applied to base materials such as glass or metals in the form of thin coatings which are adherent and continuous.

It is a further object of this invention to precipitate colloidal silica from silica aquasols in the form of a precipitate which is readily separated from the aqueous phase of the aquasol and is colloidally dispersible in a water solution of an alkaline substance, particularly in water solutions of an alkali metal silicate or hydroxide.

It is a further object of this invention to provide a solid composition comprising colloidal silica which is capable of being colloidally dispersed in water solutions of an alkaline substance, particularly water solutions of alkali metal silicates or hydroxides.

Still further objects and advantages of this invention will become apparent from the following description and the appended claims.

The novel compositions of this invention comprise a stable, homogeneous aqueous sol or aqueous dispersion of a stable, alkaline silica aquasol and a colloidally dispersed or alkali soluble organic polycationic substance such as gelatin or casein. The composition should contain an amount of the organic polycationic substance sufficient to provide an adherent, continuous film when the composition is applied to a clean glass surface as a wet film about 0.006 inch thick and then dried. This amount of organic polycationic substance will vary with the particular substance used. In the case of gelatin, for instance, the amount used should be at least 1 part by weight of gelatin for 8 parts by weight of silica solids in the composition, and in the case of casein, for example, the amount used should be at least 3 parts by weight of casein for 8 parts by weight of silica solids in the composition. However, the amount of organic polycationic substance used should not appreciably detract from the properties of the colloidal silica per se in the coating prepared from the composition, and preferably should not, in most instances, exceed the weight of colloidal silica in the composition. In most cases therefore, the weight ratio of organic polycationic substance to colloidal silica in the composition is between about 1:8 and 1:1. In general, best results are obtained when the weight ratio of the organic polycationic substance to colloidal silica is greater than 1:8, but less than 1:1. For example, in the case of gelatin best results are obtained by using between about 1.5 and 3 parts by weight of gelatin for 8 parts by weight of colloidal silica in the composition, with optimum results being obtained using 1 part by weight of gelatin for 4 parts by weight of colloidal silica. In the case of casein best results are obtained by using from about 3 to 4 parts by weight of casein for 8 parts by weight of colloidal silica in the composition. The amounts of other organic polycationic substances required are about the same as gelatin or casein, and in some instances will fall in the range between gelatin and casein.

From the foregoing it is seen that gelatin gives adherent, continuous coatings with colloidal silica on glass or metal surfaces at much lower concentrations, in respect to the colloidal silica, than casein. Moreover, the gelatin concentrations may be varied more widely than the casein concentrations, and the films prepared from gelatin and colloidal silica are superior to the films of casein and colloidal silica from the standpoint of adhesion and resistance to breaking or cracking, especially in the case of the thicker films or coatings. Accordingly, gelatin is preferred over casein or the other organic polycationic substances which may be used in the compositions of this invention. Casein, however, does have the advantage in certain instances since the coatings or films of casein and colloidal silica are more resistant to water than films or coatings prepared from gelatin and colloidal silica compositions.

The concentration of colloidal silica in the aqueous compositions of this invention may vary considerably and is generally limited, on the one hand, by the minimum thickness of the coating which it is desired to form and, on the other hand, by the viscosity of the composition. With regard to the minimum concentration, it is possible to use compositions which will form a monolayer film or coating of colloidal silica and in such instances concentrations of colloidal silica of 0.01% by weight or less may be used in the composition. On the other hand it is sometimes possible or desirable to use more concentrated compositions and it is desirable, in such instances, to use compositions containing up to about 25% by weight of colloidal silica. Compositions containing less than 10% by weight of colloidal silica are preferred.

The term "stable, alkaline silica aquasol" as used in this description and the appended claims is intended to mean a stable colloidal dispersion of silica in water which has a pH above 7, preferably between 8.5 and 10.5, is stable for a period of at least 2 months at room temperature, contains less than .08% by weight of electrolyte and has a weight ratio of $Na_2O$ to $SiO_2$ less than 1:50. Such aquasol may be prepared in various ways, for example, it may be prepared by the procedures described in the White Patent No. 2,375,738, granted May 8, 1945, the Di Maio Patent No. 2,515,949 or the Bird Patent No. 2,244,325. A preferred alkaline silica aquasol for the purposes of this invention may be prepared by first reacting a mineral acid such as sulfuric acid with an aqueous solution of an alkali metal silicate such as sodium silicate until an acid sol is obtained. The resulting sol soon sets up into a gel which is allowed to synerize and is then broken up into lumps and washed with water to remove electrolytes present in the gel. The washed lumps of gel are covered with a weak aqueous solution of a substance capable of forming hydroxyl ions, for example, sodium hydroxide. After the gel has absorbed the hydroxyl ions in the covering solution, it is separated from the excess solution and is heated, while avoiding the evaporation of water, until the major portion of the gel is converted to a sol. The sol is then separated from the unconverted gel. The foregoing process is described in greater detail in Example I, which appears hereinafter, and in the White patent referred to above. The stable, alkaline silica aquasols may contain up to 35% by weight of colloidal silica.

The aqueous compositions of this invention may be prepared by adding the organic polycationic substance such as gelatin directly to the alkaline silica aquasol and dissolving or dispersing the organic polycationic substance therein. Such compositions may also be prepared by first dissolving the organic polycationic substance in water or in water containing an alkaline substance such as an alkali metal hydroxide and the resulting solution may then be mixed with or added to the stable, alkaline silica aquasol and mixed until a homogeneous solution or dispersion is obtained. The latter procedure is preferred and in such instances the solution of the organic polycationic substance preferably should be substantially neutral or alkaline, that is, it preferably should have a pH between about 6.5 and 10.5. The compositions of colloidal silica and the organic polycationic substance should have a pH above 7.5, and preferably should have a pH between about 8.5 and 10.5 for maximum stability.

The term "organic polycationic substance" as used herein and in the appended claims is intended to include those organic compounds which have at least 2, and preferably 4 or more, amino or imino groups in the molecular unit and which are soluble or colloidally dispersible in neutral or alkaline aqueous solutions. Organic polyamine compounds having such characteristics and which also have a molecular weight above 500 are preferred. The most suitable compounds are those which are soluble in water under acid, neutral and alkaline conditions and such compounds are preferred above all other organic polycationic substances.

As examples of organic polycationic substances which are useful in preparing the aqueous compositions of this invention, in addition to gelatin and casein hereinbefore referred to, may be mentioned polyvinylpyridine or the water-soluble or alkali-soluble proteins such as globulin, as for example, ovoglobulin, edestin and the like; albumins as, for example, lactalbumin and vegetable albumin, glutelins as, for example, glutenin; histones as, for example, globin; protamines; water or alkali-soluble phosphoproteins and the like. Gelatin is the preferred organic polycationic substance not only because it is commercially available and is soluble in water under acid, neutral or alkaline conditions, but also for the reasons hereinbefore given.

The aqueous compositions of this invention may also comprise various additives which are compatible with the colloidal silica and the organic polycationic substance. For example, the compositions may comprise various types of preservatives which inhibit decomposition or putrefaction of the organic polycationic substance, particularly when such substance is a protein. As examples of such preservatives may be mentioned pine oil, chloroform, ortho phenyl phenate, chlorinated phenols such as pentachlorphenol, sodium pentachlorphenate and the like. Such preservatives need only be used in small amounts, for example, about 0.01 to 2% on the weight of the composition.

The aqueous compositions of this invention may be used for a wide variety of purposes, but they are particularly useful for applying an adherent, continuous film comprising colloidal silica on relatively inflexible base materials such as glass or metals. On the application of a thin film of the aqueous compositions to such base materials followed by drying an adherent, continuous coating film of colloidal silica and the organic polycationic substance is obtained. This in contrast to the coatings obtained from aqueous solutions of colloidal silica per se or the organic polycation substance per se, since colloidal silica per se gives a film which cracks and shatters on drying and has poor adhesion, and an organic polycationic substance such as gelatin per se gives a film which cracks and shatters on drying. By subjecting the coatings obtained from the aqueous compositions of this invention to a temperature sufficiently high to burn or oxidize the organic substance in the coating, a colloidal silica coating is obtained which has excellent adhesion to the base material such as glass or metal and which is continuous, although porous, and does not crack or shatter on cooling. Oxygen containing chemicals such as ammonium nitrate, perchlorates, and organic nitrates may be incorporated in the composition to aid in the oxidation or combustion of the organic substance. Since the colloidal silica coating is an electric insulator metal sheets containing such a coating may be electrically insulated from each other in this manner even though the spacing between the sheets is relatively small. The aqueous compositions of this invention may also be used for treating textile fibers or fabrics to increase the interfiber friction of such textile materials, and they also may be used to improve the slip resistance of paper. The aqueous compositions of this invention or suitable modifications thereof may also be treated as hereinafter described to produce a dry precipitate comprising colloidal silica which is colloidally dispersible in water or water containing alkaline substances such as alkali metal hydroxides or silicates.

In preparing colloidal silica precipitates from the aqueous compositions hereinbefore described or from suitable modifications of such compositions the pH of the composition, which is above 7.0, is lowered until the major portion of the colloidal silica is precipitated from the aqueous phase of the composition in the form of a precipitate which is capable of being filtered or centrifuged. The precipitated material is then removed from the aqueous phase by filtration, centrifugation or decantation and is dried or allowed to dry. The precipitate is preferably washed with water prior to the drying step to remove substantially all water-soluble salts and other water-soluble substances from the precipitate. Depending upon the particular conditions of precipitation and the organic polycationic substance present in the composition from which the precipitate is prepared, it is possible to prepare dry precipitates comprising colloidal silica which are dispersible in water solutions of alkaline substances such as alkali metal hydroxides or silicates to provide colloidal dispersions or sols having fair to good stability under alkaline conditions.

In preparing colloidal silica precipitates according to the foregoing procedure the weight ratio of the organic polycationic substance to colloidal silica in the aqueous composition from which the colloidal silica is precipitated may vary considerably (particularly when an aqueous composition of colloidal silica and gelatin is used), and is not nearly as critical as in the aforementioned cases where the compositions are used to prepare adherent, continuous coatings or films. Thus, when the organic polycationic substance in the composition is gelatin, it is possible to use a composition containing 1 part by weight of gelatin solids for every 1 to 60 parts by weight of colloidal silica solids. It is also possible to use a composition containing more than 1 part by weight of gelatin solids for each part by weight of colloidal silica solids, but if the weight ratio of gelatin to colloidal silica in the composition is too high, an appreciable amount of the gelatin is not co-precipitated with the colloidal silica with the result that this amount of gelatin is discarded or lost on removal of the precipitate from the aqueous phase. Moreover, the large amount of gelatin in the precipitate may adversely affect the uses of the colloidal silica on redispersion. On the other hand, if the weight ratio of colloidal silica to gelatin in the aqueous composition is too high, say appreciably above 60:1, it becomes difficult to precipitate the colloidal silica in a readily filterable form or without substantial agglomeration, and redispersion of the precipitate is also rendered difficult. For best results, from the standpoint of the type of precipitate produced and ease of redispersion of the precipitate, it is preferred to use an aqueous composition containing 1 part by weight of gelatin for every 4 to 50 parts by weight of colloidal silica for the preparation of the colloidal silica precipitate. When organic polycationic substances other than gelatin are used, the proportions of such substances to colloidal silica are generally the same as in the aqueous colloidal silica-gelatin compositions described immediately above. Gelatin gives readily filterable precipitates with colloidal silica, which precipitates are colloidally dispersible in water containing alkali metal hydroxides and silicates, and is materially superior to other organic polycationic substances in these respects. Hence, gelatin is preferred for use in the compositions from which the colloidal silica precipitates are prepared.

The temperature of the aqueous colloidal silica-organic polycationic substance composition from which the colloidal silica is precipitated may be varied considerably depending on the particular organic polycationic substance used. Some of such substances particularly the albumins, globulins and glutelins are coagulated by heat and the temperature of the composition in such cases should not be high enough to coagulate the polycationic substance. Compositions of colloidal silica and gelatin, on the other hand, may be used at temperatures between about 5 and 100° C. In most instances the mixture is suitably formed and maintained within a temperature range of 15 to 40° C., and this temperature range is preferred for most purposes.

In carrying out the precipitation of colloidal silica, the aqueous composition containing the colloidal silica and organic polycationic substance is acidified with an amount of a strong acid such as a strong mineral acid or organic acid sufficient to precipitate colloidal silica from the composition. At the same time that the colloidal silica is precipitated a substantial portion of the organic polycationic substance is co-precipitated with the colloidal silica. The acidification is preferably carried out gradually and with vigorous agitation. The amount of acid required to effect precipitation will vary considerably depending on the particular acid used and the particular substances in the composition which is being acidified. The amount of acid used should be sufficient to cause precipitation of a substantial amount, that is 60% or more, of the colloidal silica. However, the amount of acid added preferably should not lower the pH of the composition below 2.0.

The preferred class of acids for carrying out the acidification step are the mineral acids including sulfuric acid, hydrochloric acid, phosphoric acid and the like. Sulfuric acid and hydrochloric acid are particularly preferred. Strong organic acids, that is organic acids which are capable of lowering the pH of the mixture to about 3.0, are also useful. As examples of such acids may be mentioned formic and acetic acid.

The precipitates formed by the acidification of the composition of the colloidal silica and organic polycationic substances in the aqueous medium vary in their characteristics depending upon the particular substances present in the composition. For example, the precipitates formed by the acidification of compositions of proper proportions of gelatin and alkaline silica aquasols are generally curdy precipitates which are readily filtered or centrifuged and thus are readily separated from the liquid phase. They are also easy to wash and dry.

As was pointed out previously herein, the precipitates, after filtration or centrifuging or separation in some other manner as by decantation, are preferably washed with water to remove electrolytes and other water-soluble substances. This is preferably done so that the precipitate will be readily dispersible in water solutions of alkaline substances. The presence of electrolytes interferes with redispersion in some instances as, for example, in colloidal silica-gelatin precipitates, particularly when the precipitates contain more than 1%, on the dry weight of the precipitate, of water-soluble electrolytes. However, washing of the precipitate with water is not necessary in all instances particularly when the concentration of electrolyte in the precipitate is less than 0.05% on the weight of the dry precipitate. The resulting material may be redispersed as described herein without drying.

The precipitates may be dried by known procedures, for example, by drum drying at temperatures of 60 to 90° C. Another suitable drying procedure consists in washing the precipitate with methyl alcohol or ethyl alcohol or some other low boiling water miscible organic liquid such as acetone to replace a substantial amount of the water in the precipitate. The resulting material is then air dried or dried at temperatures of about 50 to 100° C.

The precipitates whether in the wet or dry state comprise essentially a combination of the colloidal silica and the organic polycationic substance, for example, gelatin. These substances are present in the precipitate in approximately the same proportions as they are present in the composition before acidification and this is particularly true when the weight ratio of colloidal silica to organic polycationic substance is high. In general, precipitates of colloidal silica and gelatin comprise from about 2 to 50 parts by weight of colloidal silica for each part by weight of gelatin.

The colloidal silica is believed to be combined with the organic polycationic substance either by a weak chemical linkage such as salt-like bridges or by ionic or electrostatic charges as evidenced by the nature of the precipitate as contrasted to a precipitate of either starting substance alone and also in view of the fact that the co-precipitate is immediately formed at pH values which are usually insufficient to cause immediate precipitation of the colloidal silica or the organic polycationic substance. For example, the acidification of a composition of proper proportions of gelatin and an alkaline silica aquasol results in the immediate precipitation of a combination of colloidal silica and gelatin, whereas the alkaline silica aquasols do not precipitate or gel immediately after acidification and the gelatin per se does not precipitate at all from an acid solution. Moreover, the co-precipitate of colloidal silica and gelatin is curdy and readily filtered whereas gelatin does not precipitate when acidified and the acidification of silica aquasols results either in the formation of a gel or a slimy precipitate which cannot be filtered.

The mechanism of this chemical combination in the case of silica aquasols and gelatin is believed to be, generally, that the colloidal silica, which is a weakly anionic substance, reacts with the gelatin, which acts as a polycationic substance in an acid medium, to form a salt-like compound which is insoluble in an acidic aqueous solution and thus separates out as a precipitate. The colloidal silica is apparently held under acid conditions to the gelatin molecule at the amino or imino groups therein by ionic or electrostatic forces with the result that the colloidal silica particles are unable to agglomerate as is the case when the gelatin is not present. This is also borne out by the fact that when the precipitate is stirred in an aqueous solution of alkali the silica particles are redispersed in the form of a colloid indicating that there has been no substantial agglomeration of the colloidal silica particles during acidification as is normally the case when gelatin is not used. Apparently also the gelatin does not act as a polycationic substance in an alkaline medium, since a precipitate is not formed under alkaline conditions. It is believed that this mechanism of reaction also applies to the other organic polycationic substances described herein. However, it is to be understood that the above mechanism of reaction is given by way of explanation, and it is not intended that the present invention be limited to the theory of reaction described herein.

As mentioned above, the co-precipitates of colloidal silica and the organic polycationic substance such as gelatin are dispersible in water solutions of alkaline substances. The resulting dispersions are stable for periods of several weeks to a year or more depending on the particular substances employed. For example co-precipitates of colloidal silica and gelatin are dispersible in water solutions of alkaline substances in amounts of 0.01 to 15% by weight and form bluish opalescent colloidal solutions which are stable from 3 to 12 months depending on the alkaline substance present in the aqueous dispersing medium. It is preferred to use aqueous solutions containing an amount of alkaline substance sufficient to provide a final dispersion having a pH of 8.5 to 10.5 for dispersing the co-precipitate.

A large variety of alkaline substances may be used in the water dispersing medium for the redispersion of the co-precipitates of colloidal silica and organic polycationic substances. As examples of suitable alkaline substances may be mentioned alkali metal hydroxides such as sodium hydroxide; alkali metal silicates such as sodium silicate; ammonium hydroxide; and strong organic bases such as triethanolamine and trimethyl benzyl ammonium hydroxide and the like. Water solutions of the alkali metal hydroxides and silicates, particularly sodium hydroxide and sodium silicate, are preferred for the purpose of redispersing the co-precipitates of colloidal silica and organic polycationic substances.

Colloidal dispersions or sols of the redispersed coprecipitates are useful for the same purposes as the starting dispersions or sols of colloidal silica. Thus, a dispersion or sol of redispersed colloidal silica and gelatin is suitable for the treatment of textile fibers to increase the slip resistance of the fibers and for the treatment of textile fabrics to increase the slip resistance of the textile yarns in the fabrics. The redispersed co-precipitates of colloidal silica and gelatin are also useful for the treatment of paper to improve the tear strength of the paper. Moreover, when a sol or dispersion of the redispersed co-precipitates of colloidal silica and organic polycationic substance contain such substances in the proper weight ratio, as hereinbefore described with reference to the starting aqueous compositions, it is possible to form adherent, continuous coatings or films comprising colloidal silica and the organic polycationic substance.

In addition to the preparation of redispersible co-precipitates as described herein, the processes of this invention may be used generally to remove small amounts of colloidal silica from dilute solutions or sols of silica where recovery by evaporation would be uneconomical; or the processes described herein may be used to concentrate colloidal silica in an aqueous medium where heat could not be used for that purpose or to effect removal of salts from the solution or dispersion of colloidal silica by precipitating the colloidal silica as hereinbefore described and then separating and washing and redispersing the co-precipitate. Other uses for the processes described herein will be apparent to those skilled in the art to which this invention appertains. The gelatin in the redispersed solution or sol may be removed if desired by precipitation with a gelatin precipitant such as tannic acid.

A further understanding of the compositions and processes of this invention will be obtained from the following specific examples which are intended to illustrate such compositions and processes, but are not intended to limit the scope of the invention, parts and percentages being by weight, unless otherwise specified.

*Example 1*

An alkaline silica aquasol was first prepared as follows:

Seventy-three parts of 66° Bé. $H_2SO_4$ were diluted with 358 parts of water and charged to a mixing tank. Four hundred and seventy-two parts of an aqueous sodium silicate solution analyzing 8.9% $Na_2O$ and 29% $SiO_2$ were diluted with 377 parts of water. The silicate solution was added with stirring to the acid solution. The resulting mixture set up as a gel in a few minutes after the mixing was completed. After the gel had aged for 16 hours the syneresis liquor was drained off and the gel was crushed to one-inch lumps. The gel lumps were washed with a continuous flow of water for 16 hours and were then covered with 750 parts of water containing 0.9 part of NaOH. After standing for 6 hours the solution was drained off and a portion of the gel lumps were charged to an autoclave equipped with a steam jacket. The gel was heated for 4 hours, using steam at 215 pounds per square inch absolute pressure in the jacket of the autoclave. The contents of the autoclave were then blown out and the residual undispersed gel was removed from the resulting sol by centrifuging. The sol thus produced contained about 12.5% $SiO_2$ and had a pH of about 9.5 (measured by a glass electrode). This sol was then concentrated by heating on a water bath, with stirring, until the sol contained 32% silica.

Twelve and five tenths parts of the 32% silica aquasol as prepared immediately above were mixed with a solution which consisted of 26.5 parts of water, 1 part of gelatin, 0.6 part of 1 N aqueous hydrochloric acid and 1 part of 5 N aqueous ammonia. An aqueous film of 0.006 inch thickness of the resulting composition was applied on a glass plate by means of a Bird applicator and the film was air dried. A continuous adherent film of colloidal silica and gelatin was obtained. In contrast the silica aquasol per se and the gelatin solution per se gave films which shattered and cracked on drying, and these films were not continuous or adherent.

*Example II*

Six tenths part of sodium pentachlorphenate, used as a preservative, was dissolved in 370 parts of cold water. Thirty parts of U. S. P. gelatin were then added and allowed to soak in the water for 15 minutes. The resulting mixture which was at a pH of about 6.5 was then heated to 50° C. and 800 parts of an alkaline silica aquasol containing 15% colloidal silica, prepared according to the procedure described in the first paragraph of Example I, were added with stirring. The resulting dispersion or sol contained about 10% of colloidal silica and was stable for a period of at least 3 months.

The above composition was applied to a glass plate according to the procedure described in the second paragraph of Example I and was then dried at a temperature of 100° C. The resulting coating was continuous and adhered exceptionally well to the glass plate, and the coating did not crack or shatter during drying or cooling. The coated glass plate was then held in a Bunsen flame whereupon the coating first blackened and then burned clear. On cooling, it was found that the glass contained an exceptionally adherent, evenly distributed, bluish coating of silica. Such a coating could not be produced with silica aquasol per se since the coating shattered and did not adhere to the glass.

*Example III*

A clean steel panel was coated with the composition described in the first paragraph of Example II according to the procedure described in the second paragraph of Example I. The coated steel panel was ignited in a hot flame to burn off all of the organic matter in the coating, and on cooling the steel panel had a thin, adherent, even silica coating. The foregoing procedure was repeated three times thus providing a thick, adherent, continuous coating of silica on the steel panel. The procedure of applying additional layers of colloidal silica was also carried out with silica aquasols per se. However, it was not possible to apply the initial coating of silica with a silica aquasol per se because of poor adhesion and shattering of the coating.

The above procedure of applying compositions of alkaline silica aquasols and gelatin followed by ignition of organic material was also employed successfully on clean aluminum panels.

*Example IV*

Twelve and five-tenths parts of the 32% silica aquasol, prepared as described in the first paragraph of Example I, were added to 20 parts of a neutral 5% water solution of U. S. P. gelatin. The resulting mixture was agitated until a homogeneous solution was obtained. The resulting solution contained 4 parts of dry silica solids for each part of dry gelatin solids. After the solution was stirred thoroughly, acetic acid was added in an amount sufficient to lower the pH of the solution to 4.5. A curdy precipitate formed immediately and settled out of the solution leaving a clear, supernatant liquid above the precipitate. The precipitate was separated from the liquid phase by filtration and was then washed three times with water to remove water-soluble electrolytes, primarily sodium acetate and sodium sulfate. The precipitate was finally washed with methanol and was then allowed to air dry to a constant weight. The dry precipitate was a white brittle solid which was readily comminutable to a white powder. The powder contained about 4 parts of colloidal silica for each part of gelatin.

About 10 parts of the dry powder were agitated in 90 parts of cold water containing an amount of sodium hydroxide sufficient to provide a dispersion having a pH of 9.5 (glass electrode). These ingredients were allowed to stand for about 10 minutes to allow the gelatin in the product to swell in the water, after which they were agitated vigorously until a blue opalescent colloidal solution was obtained. This colloidal solution was stable for at least 6 months.

The starting alkaline silica aquasol when acidified with acetic acid to a pH of 4.5 in the absence of gelatin formed a soft, highly gelatinous, non-filterable precipitate after standing for a considerable period of time.

*Example V*

The alkaline silica aquasol containing 12.5% silica solids prepared as described in the first paragraph of Example I was concentrated on a water bath until it contained 15% silica solids. Thirty-three hundred thirty-two milliliters of water were added to 3333 milliliters of the above 15% silica aquasol with stirring, after which 666 milliliters of a neutral 5% water solution of U. S. P. gelatin were added with stirring. After a homogeneous solution was obtained, 200 milliliters of 0.1 N watersolution of hydrochloric acid were added and the resulting mixture was stirred vigorously during and after the addition of the acid solution. A curdy co-precipitate of colloidal silica and gelatin was formed almost immediately concurrent with the addition of the acid. This precipitate was readily separated from the supernatant liquid by filtering with suction. The separated precipitate was washed three times with methanol and was allowed to dry at room temperature to a constant weight. The dry product contained about 50 parts of dry colloidal silica for each part of dry gelatin. The dry, white brittle precipitate was ground to a white powder. Five parts of this powder were added to 95 parts of cold water containing sufficient sodium hydroxide to provide a final dispersion having a pH of 10.0, and the resulting mixture was allowed to stand 10 minutes to swell the gelatin. The mixture was then agitated and a bluish opalescent colloidal solution having excellent stability was formed.

The starting alkaline silica aquasol when acidified with hydrochloric acid in the absence of gelatin formed a soft, highly gelatinous, non-filterable precipitate after standing for a considerable period of time.

Various modifications and changes in the products and processes described herein may be made by those skilled in the art to which this invention appertains without departing from the spirit and intent of the present invention. Accordingly, it is intended that this invention should not be limited except by the scope of the appended claims.

This application is a continuation-in-part of my copending application Serial No. 198,486, filed November 30, 1950, now U. S. Patent No. 2,737,500, issued on March 6, 1956.

What is claimed is:

1. A homogeneous composition of matter consisting substantially of a stable, alkaline, aqueous dispersion of gelatin and a stable, alkaline silica aquasol containing up to 35% by weight of colloidal silica, said colloidal silica and gelatin being present in a weight ratio between about 8:1.5 and 8:3.

2. A dry co-precipitate of colloidal silica and gelatin in which the colloidal silica and gelatin are present in the weight ratio of about 2:1 to 50:1, said co-precipitate containing less than 1% by weight of water-soluble electrolytes and being colloidally dispersible in water solutions of alkali metal hydroxides and alkali metal silicates at a pH of about 8.5 to 10.5.

3. A homogeneous composition of matter consisting of a stable, alkaline aqueous dispersion of (1) a stable, alkaline silica aquasol containing colloidal silica, (2) gelatin and (3) from about 0.01 to 2%, on the weight of the composition, of a decomposition inhibiting preservative for said gelatin, said colloidal silica and gelatin being present in a weight ratio between about 8:1.5 and 8:3.

4. A homogeneous composition of matter consisting substantially of a stable, alkaline aqueous dispersion of gelatin and a stable, alkaline silica aquasol containing up to 35% by weight of colloidal silica, said colloidal silica and gelatin being present in a weight ratio of about 4:1.

5. A homogeneous composition of matter consisting of a stable, alkaline aqueous dispersion of (1) a stable, alkaline silica aquasol containing up to 35% by weight of colloidal silica, (2) gelatin and (3) from about 0.01 to 2%, on the weight of the composition, of a decomposition inhibiting preservative for said gelatin, said colloidal silica and gelatin being present in a weight ratio of about 4:1.

References Cited in the file of this patent

UNITED STATES PATENTS

| | | |
|---|---|---|
| 1,658,289 | Heidlberg | Feb. 7, 1928 |
| 2,010,012 | Collins | Aug. 6, 1935 |
| 2,340,358 | Young | Feb. 1, 1944 |
| 2,383,653 | Kirk | Aug. 28, 1945 |
| 2,577,484 | Rule | Dec. 4, 1952 |
| 2,601,291 | Horning et al. | June 24, 1952 |
| 2,601,352 | Wolter | June 24, 1952 |